United States Patent
Holt (10) Patent No.: US 6,697,300 B1
(45) Date of Patent: Feb. 24, 2004

(54) METHOD AND APPARATUS FOR DETERMINING THE POSITIONING OF VOLUMETRIC SENSOR ARRAY LINES

(75) Inventor: Michael D. Holt, Elon, NC (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/242,823

(22) Filed: Sep. 13, 2002

(51) Int. Cl.[7] ................................................. G01S 3/86
(52) U.S. Cl. ........................................ 367/127; 367/130
(58) Field of Search ................................ 367/127, 130, 367/19, 20

(56) References Cited

U.S. PATENT DOCUMENTS

| | | |
|---|---|---|
| 4,555,779 A | 11/1985 | Roberts |
| 4,622,657 A | 11/1986 | Clare |
| 4,709,356 A | 11/1987 | Ayers |
| 4,845,686 A | 7/1989 | Brac |
| 4,910,718 A | 3/1990 | Horn |
| 5,027,333 A | 6/1991 | Halling |
| 5,058,082 A | 10/1991 | Bertheas et al. |
| 5,142,506 A | 8/1992 | Edwards |
| 5,241,518 A | 8/1993 | McNelis et al. |
| 5,410,519 A | 4/1995 | Hall et al. |
| 5,497,356 A | 3/1996 | Norton, Jr. et al. |
| 5,617,371 A * | 4/1997 | Williams ............... 367/127 |
| 5,650,981 A | 7/1997 | Jacobsen et al. |
| 5,652,593 A | 7/1997 | Rench et al. |
| 5,659,520 A | 8/1997 | Watson et al. |
| 5,668,775 A * | 9/1997 | Hatteland ............... 367/127 |
| 5,877,999 A | 3/1999 | Holt et al. |
| 6,327,537 B1 * | 12/2001 | Ikelle ................... 367/73 |

* cited by examiner

Primary Examiner—Daniel T. Pihulic (57) ABSTRACT

Method and apparatus for determining the positioning of volumetric detection array lines. In the case of a sonar array, ultrasonic frequencies are used. Transmitter subsystems including ceramic transducers, and sensors such as hydrophones, are deployed on the lines of the array and code division multiple access (CDMA) type pseudo-random numbers are used to identify each transmitter. Transit times between transducers and sensors, as determined by detector electronics, are sent to a ship-board receiver in any of various formats, so that array line position can be determined.

14 Claims, 6 Drawing Sheets

METHOD AND APPARATUS FOR DETERMINING THE POSITIONING OF VOLUMETRIC SENSOR ARRAY LINES

BACKGROUND

The art of remote sensing of objects, for example, by sonar, has been developing for many years. Initially, a single acoustic sensor was towed by or attached to a submarine or surface-going vessel. This acoustic sensor, commonly called a hydrophone, simply notified the operators of the vessel of the presence of an object, and possibly of its distance. This simple system was improved upon by devising sonar systems which included multiple sensors arranged in an array. Originally, these sensors were arranged along a tow line. The increase in the number of sensors dramatically increased the gain available for sonar systems. In addition, having multiple sensors allows a rough determination of the direction of a target. However, a single line of acoustic sensors cannot resolve vertical or "left/right" ambiguity in the position of the target. Also, overall achievable gain is limited by the strength of the line, and considerations related to towing drag and the ability to predict the coherence of the acoustic wavefront.

Figure 1:
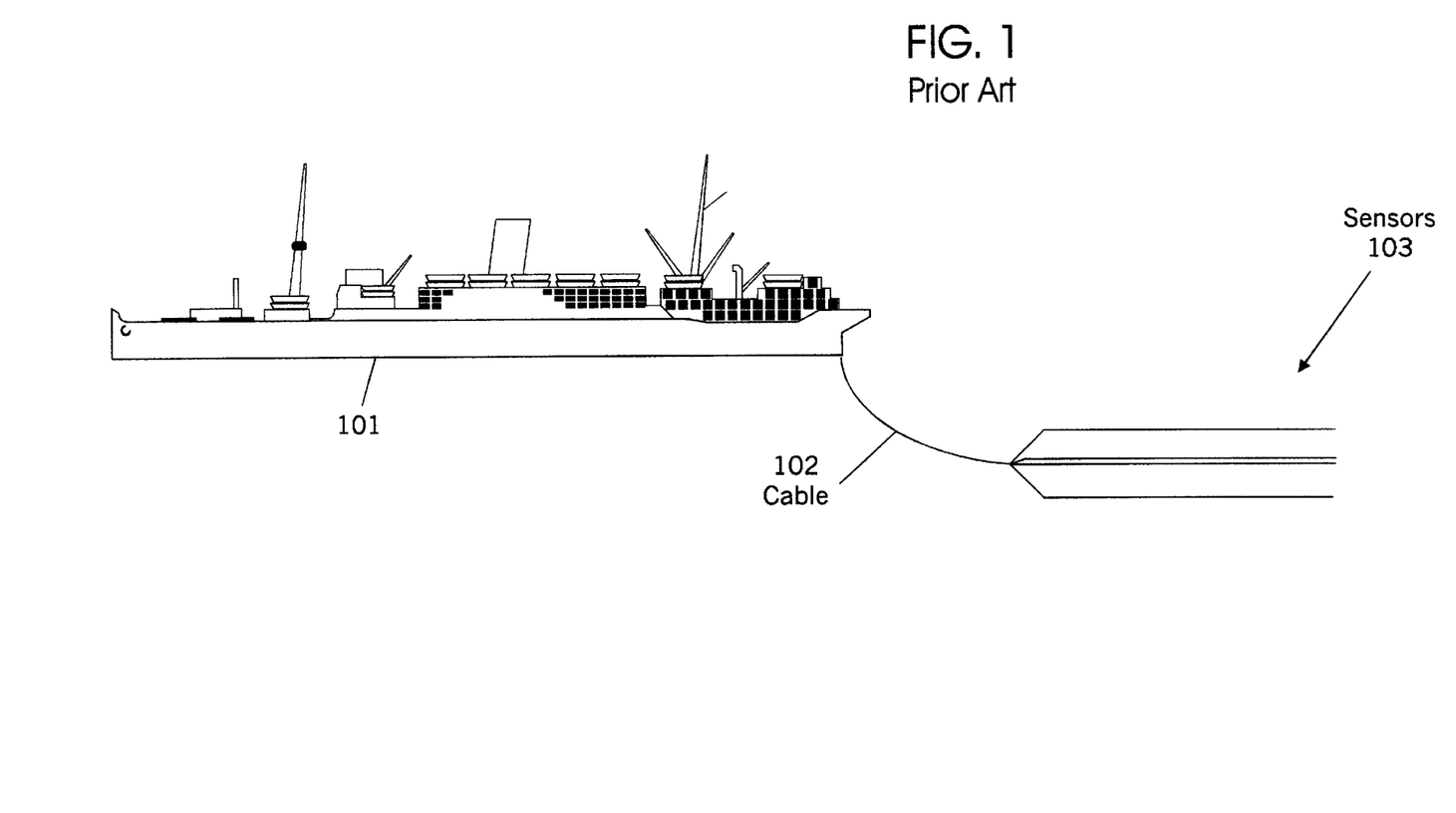
FIG. 1 illustrates the operating environment of the present invention.

The above problems have been resolved by producing what are called "volumetric arrays." FIG. 1 illustrates such an array. In FIG. 1, vessel 101 drags a tow cable, 102. The tow cable in turn is attached to a multiple-line, three-dimensional, array of acoustic sensors, 103. When the signals from these multiple lines of sensors are combined, the apparent gain is equivalent to the total number of sensors. In addition, the three-dimensional nature of the array allows beam forming and signal processing to be used in order to determine the position of a sensed object with greater accuracy than possible with single-line arrays.

The ability of a volumetric array to sense the position of objects depends on knowledge of the relative location of the elements of the array. The lines of the array may be made of rigid material or put in tension, and the relative location of the elements may be assumed. However, a flexible, free-floating array of lines can be built at lower cost than a rigid array. Such a flexible array also creates less drag, and is less likely to be damaged. It is not necessary that the elements of the array be positioned in any particular fashion. Rather, it is only necessary to know the relative positions of the elements. Therefore, various electronic means have been developed for determining the positions of the various sensors in an array at regular intervals.

Known methods of determining the position of acoustic sensors in a volumetric array suffer from one or more shortcomings. In some cases, the signals which are sent to the array elements for position sensing are within the analysis band of the array. The use of the analysis band for positioning destroys any chance of the vessel which is towing the array remaining concealed, since other vessels towing similar arrays will be able to pick up the sensing pulses. Additionally, the granularity with which positioning can be determined is dependant on the wavelength used for sensing signals. Acoustical waves have long wavelengths and thus limit the accuracy with which sensor position can be determined. Another problem with known methods is the difficulty with supplying multiple transmitters for sensing pulses. Ideally, the more transmitters that are provided, the more accuracy can be achieved. However, it is necessary for the sensors, or receivers, to be able to determine which signal is coming from which transmitter. If different frequencies are used, each transmitter must have a slightly different design, therefore raising the cost of the array. Additionally, sensors and/or receivers in the array which are to receive the sensing pulses, need to be more complex. There is a need for a volumetric array positioning system which can achieve very high accuracy, and which can remain undetected by other vessels when in use. Ideally, the system should also be able to be built out of multiple transmitters and sensors of identical design.

SUMMARY

The present invention provides for measurement system for a volumetric sensor array that enables very high accuracy determination of the exact position of the various lines of the array. The system according to the present invention operates well outside the analysis band of the array, thus facilitating a covert process. In the case of a sonar array, ultrasonic frequencies are used, which have not only the advantage of not being targeted by other vessels' sonar systems, but also the advantage of propagating poorly through seawater. In addition, the transmitters used in the invention can all operate on exactly the same ultrasonic frequency, facilitating the use of many identical transmitters, thus lowering cost as compared to systems where each transmitter must have a unique design. Furthermore, the invention employs code division multiple access (CDMA) type pseudo-random numbers in such a way that the number of transmitters which can be used, and still allow for the unique identification of each transmitter by each receiver, is limited only by mechanical considerations such as the size, weight, and drag of the array.

According to the invention, the array includes at least one, and preferably a plurality of transmitter subsystems and a plurality of sensors. The array also includes detectors, which are associated with the position determining system of the array lines. In the case of a sonar array, the sensors are typically hydrophones. In one embodiment, a shipboard receiver generates a global sync signal common to all array lines in the system. This sync is typically the same as that used in the synchronization of the acoustic channel sampling. The specific PRN sequence that is used in a specific transmitter subsystem is generated locally from the electronics included in each array line of the volumetric system of arrays. The sequence is sent to the receive lines as a synchronization pulse, so that the detectors in the receive lines can acquire the sequence, and determine the timing difference relative to the global sync timing reference. Each specific transmitter transmits its specific PRN sequence by modulating a carrier wave being sent from a transducer for the specific transmitter subsystem. The carrier wave has a frequency, which is outside the acoustic analysis band for the volumetric array. A detector on an array line identifies the specific PRN sequence at a sensor on the line and determines a transit time for the sequence from the specific transmitter to the sensor. At least two sensors are needed. Each sensor can have it's own detector, or a system could be designed in which a detector servers multiple sensors. The transit time, in increments of clock periods, is then communicated to the shipboard receiver for position determination. Because at least two sensors per line are used, both a distance and angle for the receive line involved can be determined. Also, since each transmitter subsystem has a specific pseudo-random number sequence associated with its transmission, each transmitter in the array can be uniquely identified by any detector. Arrays with many transmitters can be readily built and all transmitters can be identical. In fact, it is possible to build an array in which every line has a transmitter subsystem, detectors, and sensors. Since transmitters are identified by codes, the system works according to a code division multiple access (CDMA) scheme, similar to that used for various types of data communications.

Transit times can be sent to the shipboard receiver in any of various formats. In one embodiment, the transit times to two sensors are encoded as a pair of 16-bit words which represents a transit time from the reference transmitter to the detector pair. The phase is extracted at the shipboard receiver by applying simple trigonometric relationships based on the measured and known. In another embodiment, the transit times are converted to analog levels and sent to the shipboard receiver. In any case, a synchronization block that is inside, or closely associated with, a shipboard receiver generates the timing reference for all of the PRN sequences for all of the transmitters. The sequences can be transmitted continuously, facilitating a constant awareness of the exact positioning of the various array lines and fully exploit the inherent processing gain available in the CDMA technique.

A transmitter subsystem according an embodiment of the invention consists of a transmitter and an omni-directional ceramic transducer. The transmitter modulates the carrier wave using binary phase shifted keying (BPSK). The detectors which are used to determine the transit times and forward those back to the shipboard receiver, demodulate the carrier wave using a phased lock loop (PLL). The carrier wave has a frequency which is outside the analysis band of the array. A demodulator recovers the sequence from the carrier wave and forwards that sequence to a shifter which is connected to the demodulator and clocks out the pseudo-random number sequence to a sequence detection block. The sequence detection block within the detector identifies the specific PRN sequence from the specific transmitter by comparing the sequence received from the demodulator with the sequence received during the synchronization pulse. A counter, which began running when the global synchronization pulse is received, is latched when the sequence is detected by the sequence detection block. Finally, an accumulator is connected to the counters which keep a transit time count for each sensor. The accumulator puts the transit times into an appropriate format and communicates the transit times to the shipboard receiver. The synchronization block, the transmitter subsystems, and the detectors, together with the required sensors and transducers, all work together to form the means to carry out the method of the invention.

DETAILED DESCRIPTION OF ONE OR MORE EMBODIMENTS

The positioning system of the invention allows a code division multiple access (CDMA) scheme to be used to provide for an accuracy equivalent to a clock period of the detectors used within the system. This clock can either be an available high-speed system clock or a standalone clock included in the positioning system array hardware. Signals that are used in the positioning system are transmitted by a high-frequency omni-directional ceramic transducer that is phase-modulated with a pseudo-random number (PRN) that is synchronized across the volumetric array system. This transmitted signal is transmitted into the water at a center frequency of approximately 20–30 kHz and a bandwidth around it with resolution equivalent to the above-mentioned clock rate. The signals from the ceramic transducers are received and tracked in such a way that the specific timing of the received signal is proportional to the position of the transmit components relative to the received detectors.

Figure 2:
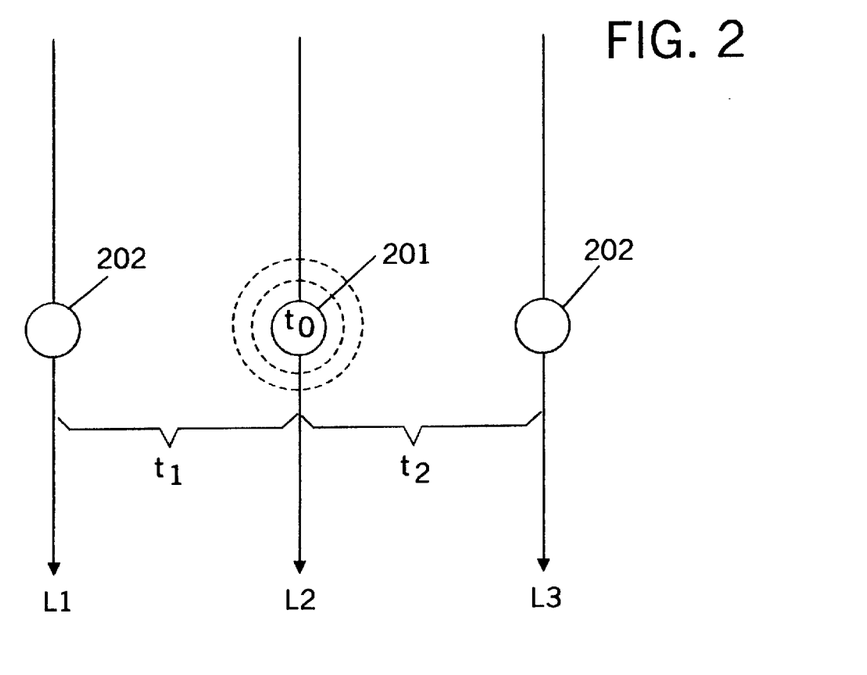
FIG. 2 illustrates a portion of a volumetric array in which in an embodiment of the invention is being used.

FIG. 2 illustrates some of the basic principles of operation of the invention. FIG. 2 is simplified for clarity FIG. 2 shows three array lines of a volumetric sonar array. Line L1 and line L3 contain hydrophones 202. Line L2 includes a ceramic transducer 201. The transducer 201 is connected to a transmitter, and the transmitter and transducer form a transmitter subsystem. The transmitter is tuned to a resonance frequency of approximately 20–30 kHz and a continuous wave is transmitted. This continuous wave is modulated at 0 phase shift or pi phase shift by direct sequence binary phase shift keying (BPSK) using maximal length sequences. The PRN sequence length is exactly equal to two synch pulses presented in the array as part of the acoustic acquisition system. At each synch a deterministic point is reached within the transmission sequence than can be reconciled by the detectors connected to the hydrophones 202. The receiving system monitors the incoming signals within the band of interest. Received signals are demodulated to digital bit streams that the detector electronics will be able to track. A deterministic situation exists by virtue of the fact that the transmit transducer on the middle line is correlated and synchronized with all other array lines via a Global synchronization pulse received from the onboard receiver system. Therefore, each receiving line will the able to accurately determine how many clock periods have elapsed from the synch pulse to the first bit of the sequence transmitted from the line which is emitting the signal of interest. In FIG. 2 the distance of line L1 from L2 is proportional to the time period $t_1$ relative to time $t_0$. Like wise, the distance of L3 from L2 is proportional to the time period $t_2$ relative to the time $t_0$. The system of FIG. 2 assumes that only the position of an arbitrary point on the array line is of interest.

Figure 3:
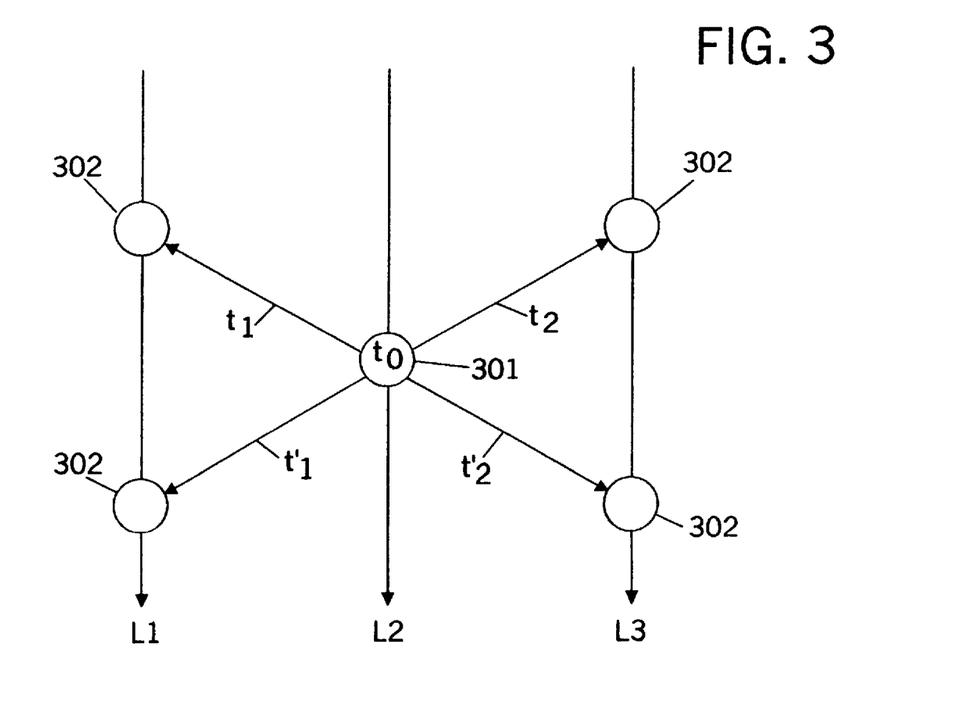
FIG. 3 further illustrates a portion of a volumetric array in which an embodiment the present invention is being used.

FIG. 3 illustrates a more accurate implementation of the position determining system of an embodiment of the invention. FIG. 3 includes the same ceramic transducer, 301, as shown in FIG. 2. FIG. 3 also includes the same three array lines L1, L2, and L3. Each of the receive lines, however, includes two hydrophones connected to the detector of the invention. Hydrophones 302 are all identical. In this case, transit time $t_1$ indicates the distance of one hydrophone on receive line L1 and transit time $t_1'$ indicates the distance of another hydrophone on receive line L1. Like wise, transit time $t_2$ indicates the distance of one hydrophone on line L3 and transit time $t_2'$ indicates the distance of another hydrophone on line L3. The use of more than one hydrophone to receive signals to be fed to the detectors of the invention on each array line allows the determination of both the distance and angle of a receive array line relative to a transmitter subsystem. As will be discussed later, the various transit times to the hydrophones of a receive array line can be encoded either as specific times or as one transit time with a phase difference between two or more hydrophones.

Figure 4:
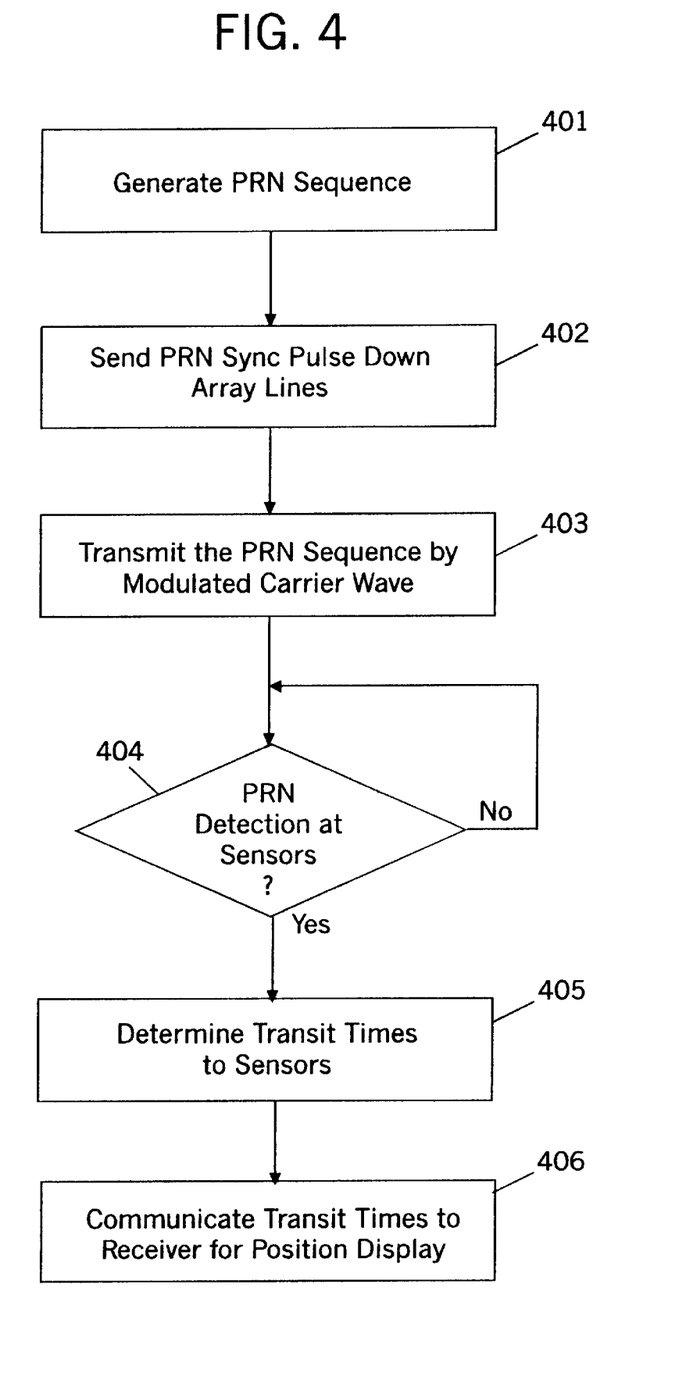
FIG. 4 is a flow chart illustrating the method of the invention according to some embodiments.

FIG. 4 illustrates the overall method according to one embodiment of the present invention. At step 401, the PRN sequence is generated, usually by a system synchronization block within the shipboard receiving equipment. At step 402, a synchronization pulse containing the PRN sequence is sent down the array line containing the transmitter subsystem and the receive lines which need to determine transit times from that particular transmitter subsystem. The transmit binary sequence is timed to fit exactly within the synch period of the array, related to sonar analysis. This attribute allows the precise time of flight value to be extracted from the received signals. At step 403 the PRN sequence is transmitted by modulating a carrier wave. At step 404, each detector determines if and when the appropriate PRN sequence is detected at its hydrophone sensors. A transit time is recorded by a counter relative to the synchronization pulse as received at each receive hydrophone. That is, the carrier at each hydrophone is tracked as an independent input. Effectively, the transit time is determined as a magnitude and phase difference. This information is used to find the distance and angle of a line. At step 405 the transit time is calculated. Finally, at step 406 the transit time is communicated to a receiver system onboard the towing vessel. It should be noted that this method of operation can be executing independently, and continuously, for numerous transmitter subsystems within the array. Multiple transducers and sensors can be disposed throughout the array in a practical system. In fact the same line can transmit one sequence, and receive another. By virtue of the uniqueness of the different sequences a network can be installed where all lines containing transmitters and receivers can be transmitting to all other lines with unique sequences. With such a system, it is possible to achieve a very high accuracy of reconciling the position of any line against any other line throughout the array.

Figure 5:
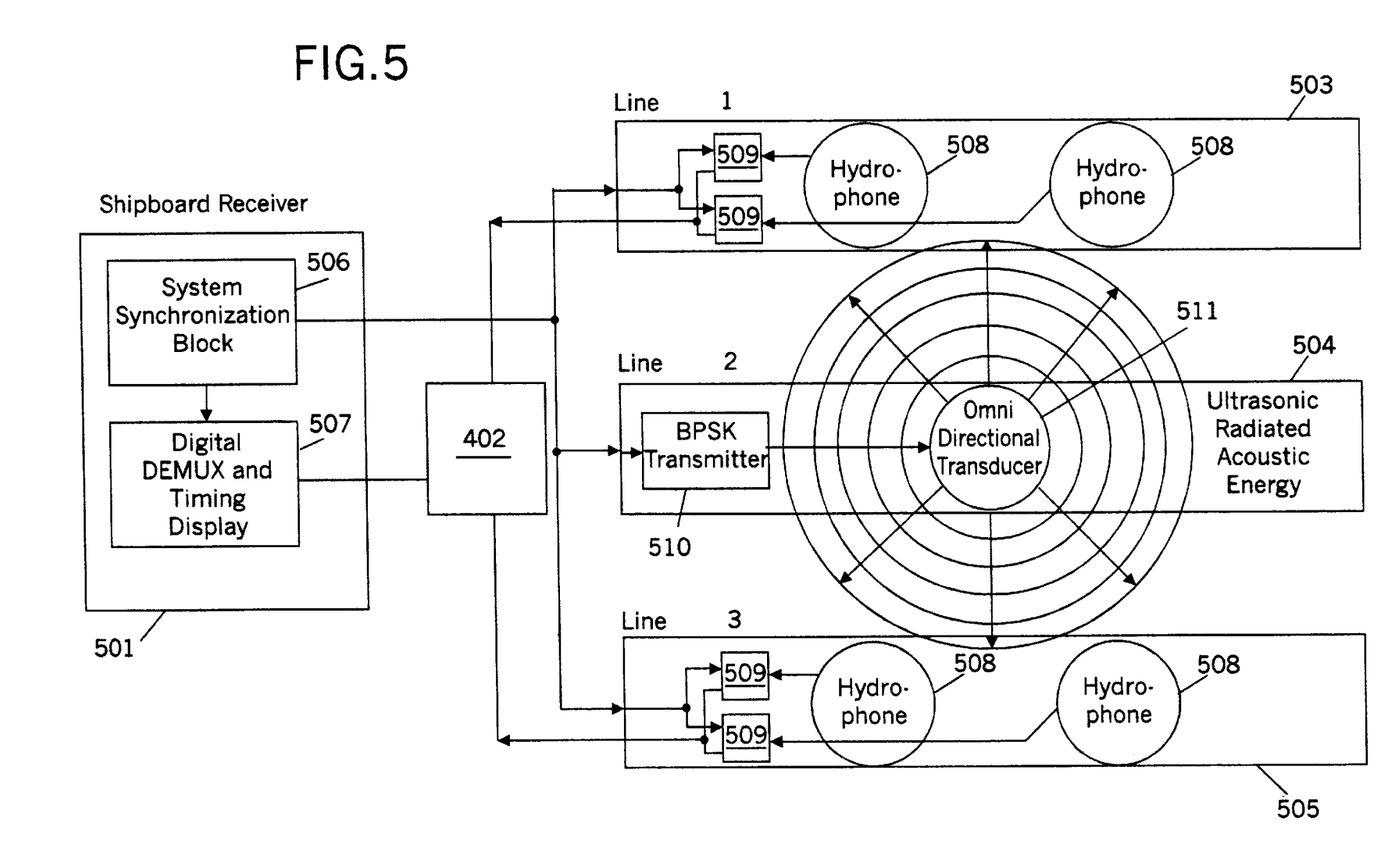
FIG. 5 is a system block diagram illustrating the hardware of some embodiments of the present invention.

FIG. 5 is a system block diagram which illustrates the operation of one embodiment of the invention. Shipboard receiver 501 contains the system synchronization block, 506, and the digital dimultiplexer and timing display, 507. System synchronization block 506 generates the PRN sequences which are necessary for the operation of the invention. A synchronization pulse containing the PRN sequence is sent to all array lines involved in the particular process associated with the specific transmitter subsystem for a given sequence. Line array 2, 504, contains a BPSK transmitter, 510. Line array 2, 504, also contains the omni-directional transducer, 511. The BPSK transmitter and ceramic transducer form the transmitter subsystem for an array line. The transducer emits ultrasonic radiated acoustic energy in the form of a carrier wave modulated with the PRN sequence. The modulated carrier wave $S_n$ can be described by a specific mathematical equation:

$$S_n = A \cos(\omega t + \phi_m)$$

where: A=transmit power
ωt=selected frequency
$\phi_m$=PRN modulation.

The carrier wave with the specific sequence is picked up by hydrophones 508 in line array 1, 503, and in line array 3, 505. Each of these receive array lines contains combined phase detector/demodulators, 509. Although these hardware blocks perform both phase detection and demodulation, such a hardware block may be referred to at various places herein as simply a "detector." At least two hydrophone sensors per line are required, however, more can be used. As shown in FIG. 5, transit times are communicated back to the digital demultiplexer and timing display, or simply, the display block, 507, in the shipboard receiver where position is calculated and possibly displayed. Additional circuitry, 502, may be needed to convert the transit times to an appropriate format. The example of FIG. 5 shows one detector associated with each sensor. The arrangement can be advantageous since it allows the hydrophone sensor and detector for each location on a line of the array to be an integrated unit, eliminating some wiring. However, an array could be designed in which a detector handled signals from two or more sensors.

The number sequence in the example embodiments discussed herein is a so-called "direct sequence" or modulation of the carrier by a digital code sequence. The implementation of this code sequence modulation incorporates a binary phase shift keying (BPSK) where the phase of the specified carrier (sinusoidal continuous wave) is passed from the modulator as a "zero phase shift" representing a binary "one" and a "π phase shift" represents a binary "zero". The specific sequence type used is a so-called "maximal sequence" specifically selected to facilitate the autocorrelation process. The spectrum associated with the spreading characteristics of these sequences is of the form (sin X)/X where the center frequency of this spectrum is equal to the carrier frequency and the null to null spacing is equal to two times the fundamental sequence clock rate.

The selection of sequence length and clock rate is conducted to assure that the sequence length time is equal to one sampling frame period of the acoustic array being supported by the positioning system. This choice eliminates ambiguity in the measurement although multiples of the frame period would be acceptable with additional synchronization circuitry. With this frame period selected, the choice of sequence length would then be predicated on the available system clocks. In some embodiments, it would be desirable to provide the maximum allowable sequence length traded off against carrier frequency selection and frame period. The length and rate of the selected sequence will determine the resolution with which the true position can be determined.

The actual process of determining the array element relative positions is accomplished through calculations based on a measurement of the time of arrival of a reference signal (originating from transducer 301 of FIG. 3) to at least two unique/spatially separate sensors on an adjacent line array and a set of known, fixed geometry constraints. From FIG. 3 one can see the geometry constraints are defined as the fixed distance between elements of L3, the fact that L2 will always be to the left of L3 and the fact that transducer (transmitter) 301 will always be less than one sequence of propagation away from hydrophones 302. By calculating the length of $t_2$ and $t_2'$ as a function of "time and sound speed" then performing a simple trigonometry derivation one can determine the position the line L3 relative to a vertical arc across line L2. By performing similar measurements between L2 and L3 as well as between L1 and L3 one can build an accurate picture of the true geometry associated with the relative position of the lines under tow. The use of high accuracy depth sensors or additional vertically displaced line arrays serves to build an even more accurate picture with respect to the location of the arrays within the volume represented by the cross section of the towed configuration.

The exact configuration of circuitry 502 will depend on the data rates and format which is acceptable to the shipboard receiver system. It is possible to adapt the array to existing systems. In an all digital embodiment, the time delay and phase are converted into a 16-bit digital word for each cycle, for each detector. In this case, circuitry 502 consists of a multiplexer. It should be noted that when the term "transit time" is used, the term can refer to one transit time for one sensor, or a transit time and phase that takes into account two sensors, or a collection of transit times for multiple sensors on the same line. Alternatively, a comparator or similar circuit can be used to convert time delays and/or phase shifts to analog voltage levels. A system can also be designed to use a frequency modulated signal proportional to the time delay. In either of these latter cases, the time delay can be said to be converted to an analog signal, notwithstanding the fact that a strict digital-to-analog conversion is not being performed.

Figure 6:
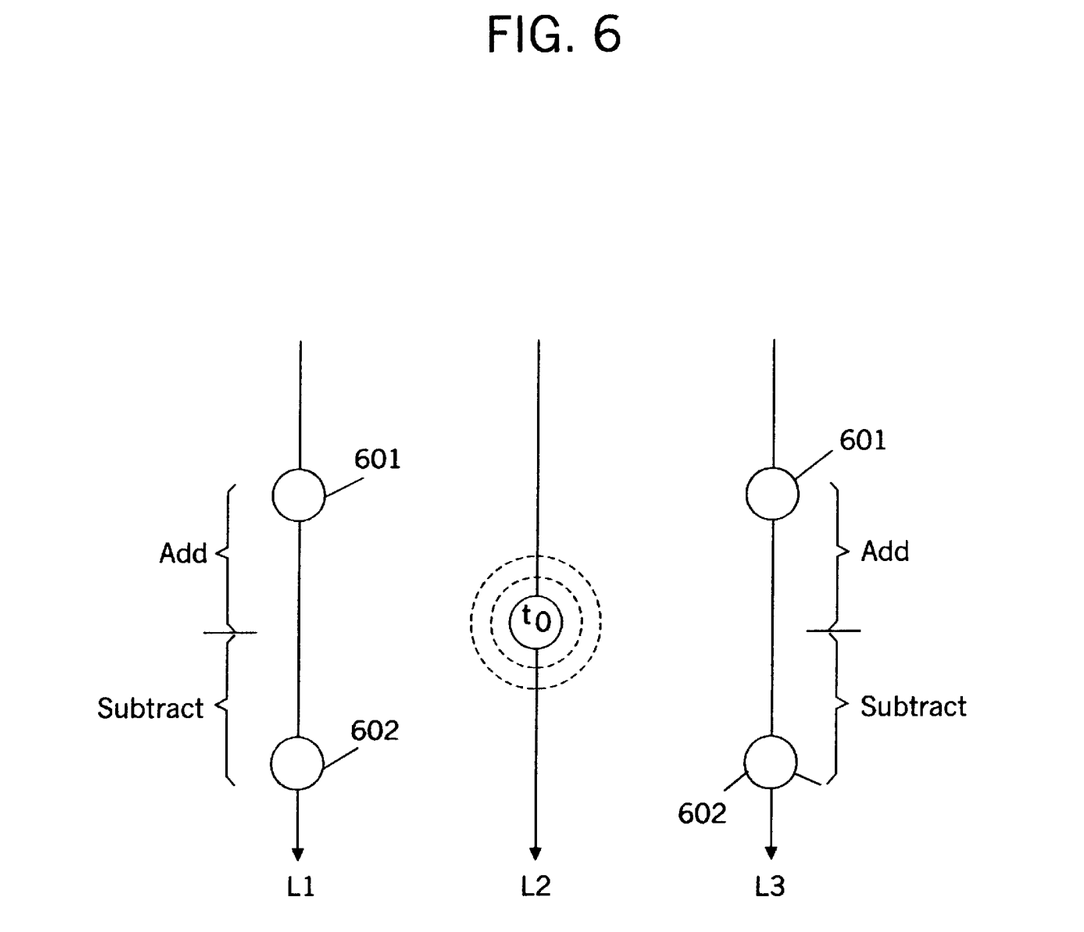
FIG. 6 is another illustration of a portion of a volumetric array in which an embodiment of the invention is employed.

Up until this point in the description of the invention, we have assumed that propagation delay of signals up and down the array lines can be neglected. While a useful array can be built neglecting these propagation delays, greater accuracy can be achieved if they can be taken into account. One of ordinary skill in the art can easily do this. FIG. 6 illustrates one way to take delays into account. In FIG. 6, it is assumed that the transmitter and detectors are located up the lines (towards the top of the drawing) from the transducer and sensors. Assuming that the transducer is a reference point, an appropriate number of counts would be added to a counter keeping track of the PRN transit times for hydrophones 601 while an appropriate number of counts would be subtracted for hydrophone 602. Hydrophones 601 are closer to the circuitry used to implement the invention, while hydrophones 602 are farther away.

Figure 7:
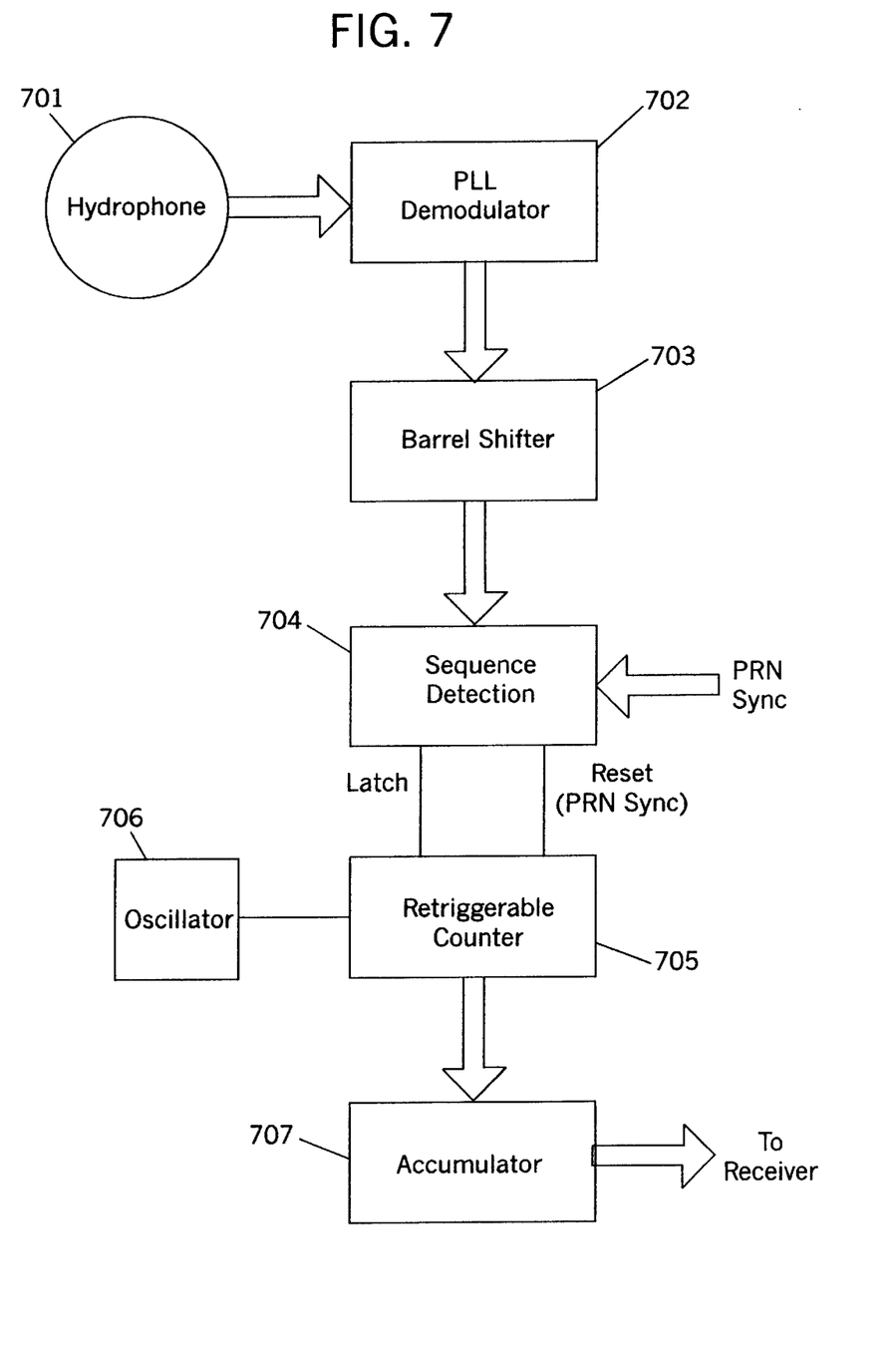
FIG. 7 is a hardware block diagram illustrating the detailed design of a detector which is used to implement some embodiments the present invention.

FIG. 7 is a block diagram of the hardware of the detector of an embodiment of the present invention. FIG. 7 illustrates both the hardware components involved, and the signal flow for phase detection and demodulation at the receive lines of an array. The process illustrated in FIG. 7, with the exception of the final accumulation of the transit time and phase, occurs independently for each hydrophone. Additionally, hardware blocks shown in FIG. 7 are duplicated where appropriate for each hydrophone being monitored. For clarity, hardware is only shown for a single channel, that is a single hydrophone. Hardware blocks which are duplicated are also shown only once for clarity of the drawing. The signal according to the invention is picked up by hydrophone 701 and sent to demodulator 702. In one embodiment, demodulator 702 is based on a phase-locked loop (PLL). The PLL tracks the carrier for the hydrophone and, through hetradyne processing, the input signal is demodulated into the original binary pseudo-random sequence. The sequence is deterministic and as such a specific unique bit pattern can be isolated. Bits demodulated by demodulator 702 are fed to a barrel shifter, 703. These bits are clocked out to a sequence detection blocks, 704, which looks for a PRN sequence which matches the PRN sequence received in the synchronization pulse. Counter 705 is a retriggerable binary counter. Counter 705 was reset by the PRN synch pulse. Upon reset, counter 705 begins running as triggered by high-frequency, free-running oscillator 706. The count recorded is relative to the synchronization pulse as well as to each received hydrophone, hence giving a phase difference and a magnitude. When the sequence detection block 704 detects the sequence it latches counter 705. The count is then fed to accumulator 707 and the count information is used to find the distance and angle of the receive line to the transmit line.

The use of different PRN sequences for each transmitter subsystem within the array allows the deployment of this hardware and method across many lines of a volumetric array. Since each transmitter subsystem has its own unique code, signals from the various transmitter subsystems are separated by identifying their codes. Hence, the system works according to CDMA principles.

The components shown in FIG. 7 represent the receiver segment of the proposed positioning system. These elements are located in the individual deployed arrays with two or more used to resolve positioning ambiguity. Hydrophone 701 has an omnidirectional element typically spherical in shape to allow omnidirectional response at the specified carrier frequencies. With a spread spectrum transmission being issued from the reference array, the continuous wave (CW) carrier is available to allow the phase lock loop (PLL) demodulator, 702, to track the reference signal. Demodulator 702 also performs a heterodyne operation to remove the carrier such that the digital information (maximal sequence) is issued to barrel shifter 703 as a serial output of binary values. The output of the barrel shifter is subjected to a comparison against an image of the reference sequence in the sequence detection blocks, 704. After the reference sequence is aligned with the acquired sequence image, a lock and track is established to give a continuous timing output. This timing reference is essentially a measure of the number of clock ticks of oscillator 706 that have elapsed since the issuance of the reference sequence start. This reference sequence is transmitted from the center line array and is reset to allow time-zero to be aligned with the system synchronization signal issues by the acoustic acquisition system. This same system synchronization pulse is issued to all line arrays as such by establishing the time difference between the receipt of this signal and the receipt of the first bit of the received sequence an accurate time can be established. As such the time of flight is determined in counter 705 and issued to the accumulator for formatting and transmission over the standard telemetry bus.

In this example embodiment, the components used to make up this assembly will include a field programmable gate array (FPGA) for items for the barrel shifter, sequence detection blocks, counter, and accumulator. The PLL demodulator, 702, is an integrated clock recovery device made up of an analog conditioning circuit and a voltage controlled oscillator that will track the incoming reference signal carrier. Oscillator 706 can be shared with the acoustic acquisition subsystem or implemented as a stand-alone device for greater timing accuracy through a faster timing reference. The signal issued from the accumulator 707 is formatted to allow a transmission over the internal telemetry bus and basically consist of a binary value representative of the number of clock ticks (or time) associated with the time of flight of the received signal.

The inboard electronics required to process this information is simply a circuit to capture the raw binary value demultiplexed from the telemetry data stream and capable of accumulating the set of timing results from all positioning elements. This processing element, which could simply be an embedded processor, dedicated microprocessor or even excess capacity available on an existing system processing component, would be programmed to perform the trigonometric translation of the data into a set of geometric vectors. These vectors are then forwarded to the data processing components of the acoustic processing suite for inclusion into algorithms associated with array shape estimation and corrected beamforming.

By continuously processing position signals as described above, a very accurate real-time position of the various lines of an array can be tracked continuously. The use of ultrasonic continuous wave frequencies facilitates covert operation. Not only are these frequencies outside the analysis band of the array, but these frequencies propagate poorly through seawater. Additionally, the system disclosed herein produces no interference in the analysis band and normally processed by a receiving sonar system. Extremely granular measurement of the position of a line is possible, much more so than with inband-based positioning systems. Typical inband-based systems achieve an accuracy based on the limitation of an acoustically sampled signal. Typically the accuracy is on the order of a wavelength divided by ten. With the invention, the accuracy is determined mostly by the clock frequency used in the received detector. The system would also have to be programmed according to the sound velocity profile for a given area. The accuracy of this profile will affect the accuracy of the positioning system of the invention. However, assuming 16-bit words are used to express the transit time and phase of the various lines, the times can be expressed in values having up to 65,000 increments. Assuming the free-running oscillator described in FIG. 7 has a frequency of approximately 7.425 MHz, a positioning accuracy of 0.000202 meters is possible.

I have described specific embodiments of my invention, which provides an accurate position determination system for a volumetric sensing array. One of ordinary skill in the sensing and electronics arts will quickly recognize that the invention has numerous other embodiments. In fact, many implementations are possible. The following claims are in no way intended to limit the scope of the invention to the specific embodiments described.

I claim:

1. A method of determining the relative position of an array line within a volumetric array connected to a receiver, the method comprising the steps of:
   generating a specific pseudo-random number (PRN) sequence;
   sending the specific PRN sequence to a specific transmitter subsystem and at least one receive line of the volumetric array;
   transmitting the specific PRN sequence by modulating a carrier wave being sent from the specific transmitter subsystem with the specific PRN sequence, the carrier wave having a frequency which is outside an analysis band for the volumetric array and the receiver;
   identifying the specific PRN sequence at, at least two sensors on the receive line of the volumetric array and determining a transit time for the PRN sequence from the specific transmitter subsystem to the sensors; and
   communicating the transit time to the receiver for position determination.

2. The method of claim 1 wherein the volumetric array operates according to a code division multiple access (CDMA) scheme so that the specific PRN sequence is one of at least two PRN sequences being transmitted by at least two transmitter subsystems within the volumetric array.

3. The method of claim 1 wherein the communicating step is accomplished by sending a digital word representing the transit time to the receiver.

4. The method of claim 1 wherein the communicating step is accomplished by sending an analog signal representing the transit time to the receiver.

5. The method of claim 2 wherein the communicating step is accomplished by sending a digital word representing the transit time to the receiver.

6. The method of claim 2 wherein the communicating step is accomplished by sending an analog signal representing the transit time to the receiver.

7. Apparatus for determining the relative position of an array line within a volumetric detection array connected to a receiver, the apparatus comprising:
   means for generating a specific pseudo-random number (PRN);
   means for sending the specific PRN sequence to a specific transmitter subsystem and at least one receive line of the volumetric array;
   means for transmitting the specific PRN sequence by modulating a carrier wave being sent from the specific transmitter subsystem with the specific PRN sequence, the carrier wave having a frequency which is outside an analysis band for the volumetric array and the receiver;
   means for identifying the specific PRN sequence at, at least two sensors on the receive line of the volumetric array and determining a transit time for the PRN sequence from the transmitter to the sensors; and
   means for communicating the transit time to the receiver for position determination.

8. A system for determining the relative position of at one least array line within a volumetric detection array connected to a receiver, each array line having a plurality of sensors, the system comprising:
   a synchronization block for generating at least one pseudo-random number (PRN) sequence;
   at least one transmitter subsystem disposed within the volumetric array, each transmitter subsystem connected to the synchronization block, each transmitter subsystem operable to modulate and transmit a carrier wave with a specific PRN sequence, the carrier wave having a frequency which is outside the analysis band of the volumetric array;
   at least one detector disposed at, at least one array line, the at least one detector connected to the plurality of sensors, the at least one detector operable to identify the specific PRN sequence and determine a transit time for the specific PRN sequence from the transmitter subsystem to a sensor and communicate the transit time to the receiver for position determination; and
   a display block within the receiver for determining the relative position of the array line based on the transit time.

9. The system of claim 8 wherein each detector is operable for providing the transit time to the receiver as an analog signal.

10. The system of claim 8 wherein each detector is operable for providing the transit time to the receiver as digital words.

11. A detector for determining a transit time of a specific pseudo-random number (PRN) sequence from a specific transmitter subsystem a sensor disposed along an array line of a volumetric array, the apparatus comprising:
   a demodulator for demodulating a carrier wave containing a PRN sequence, the carrier wave having a frequency which is outside the analysis band of the volumetric array;
   a counter for counting time intervals between a synchronization pulse and receipt of the specific PRN sequence;
   a sequence detection block for identifying the specific PRN sequence based on the synchronization pulse, the sequence detection block connected to the counter and being operable to latch the counter upon identifying the specific PRN sequence;
   a shifter disposed between the demodulator and the sequence detection block for transferring the PRN sequence to the sequence detection block; and an accumulator connected to the counter for outputting the transit time to a receiver for position determination.

12. The detector of claim 11 wherein the volumetric array operates according to a code division multiple access (CDMA) scheme so that the specific PRN sequence is one of at least two PRN sequences being transmitted by at least two transmitter subsystems within the volumetric array.

13. Apparatus for determining a transit time of a specific pseudo-random number (PRN) sequence from a specific transmitter subsystem to a sensor disposed along an array line of a volumetric array, the apparatus comprising:

means for demodulating a carrier wave containing a PRN sequence, the carrier wave having a frequency which is outside the analysis band of the volumetric array;

means for counting time intervals between a synchronization pulse and receipt of the specific PRN sequence;

means for identifying the specific PRN sequence based on the synchronization pulse, the means for identifying connected to means for counting and being operable to control the means for counting; and means for outputting the transit time to a receiver for position determination.

14. The apparatus of claim 13 wherein the volumetric array operates according to a code division multiple access (CDMA) scheme so that the specific PRN sequence is one of at least two PRN sequences being transmitted by at least two transmitter subsystems within the volumetric array.

* * * * *